No. 720,412. PATENTED FEB. 10, 1903.
W. T. ELLIS.
PLOW.
APPLICATION FILED NOV. 8, 1902.

NO MODEL.

Witnesses

Inventor
William T. Ellis
By Victor J. Evans
Attorney

UNITED STATES PATENT OFFICE.

WILLIAM T. ELLIS, OF HORTON, ARKANSAS.

PLOW.

SPECIFICATION forming part of Letters Patent No. 720,412, dated February 10, 1903.

Application filed November 8, 1902. Serial No. 130,595. (No model.)

*To all whom it may concern:*

Be it known that I, WILLIAM T. ELLIS, a citizen of the United States, residing at Horton, in the county of St. Francis and State of Arkansas, have invented new and useful Improvements in Plows, of which the following is a specification.

This invention relates to plows, and particularly refers to a special arrangement of the handles in relation to the beam and plowshare; and the objects in view are to strengthen the handles, particularly from the beam to the landside of the share, close to the ground behind the latter, to prevent the handles from becoming loose, as in ordinary plow structures, to overcome carrying of dirt by the plow between the handles behind the moldboard, and thereby render the plow lighter and free from dirt accumulations, to prevent the plow from choking when used in plowing land covered by a thick growth, and to generally improve plows and render them more strong and durable, as well as efficient in their operation.

With these and other objects and advantages in view the invention consists in the construction and arrangement of the several parts, which will be more fully hereinafter described and claimed.

Figure 1:
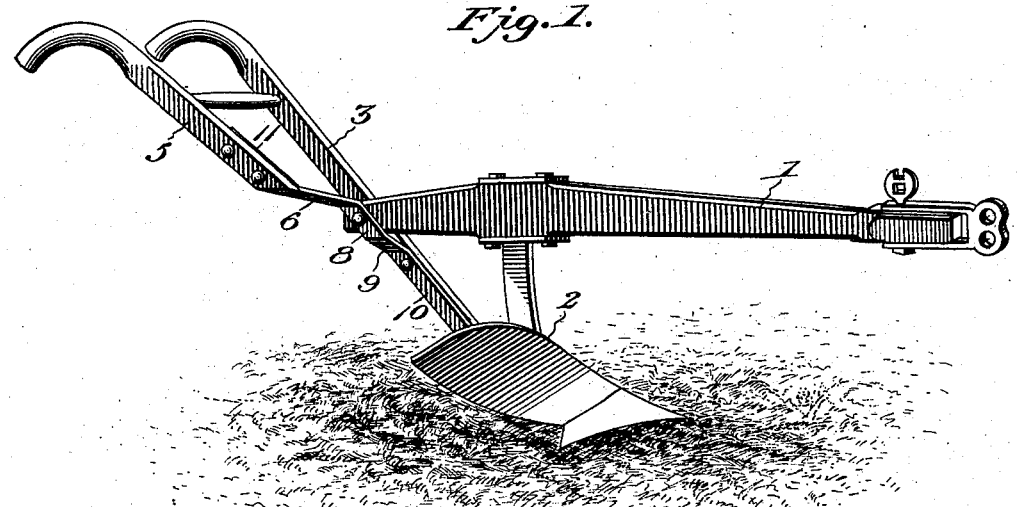
Figure 2:
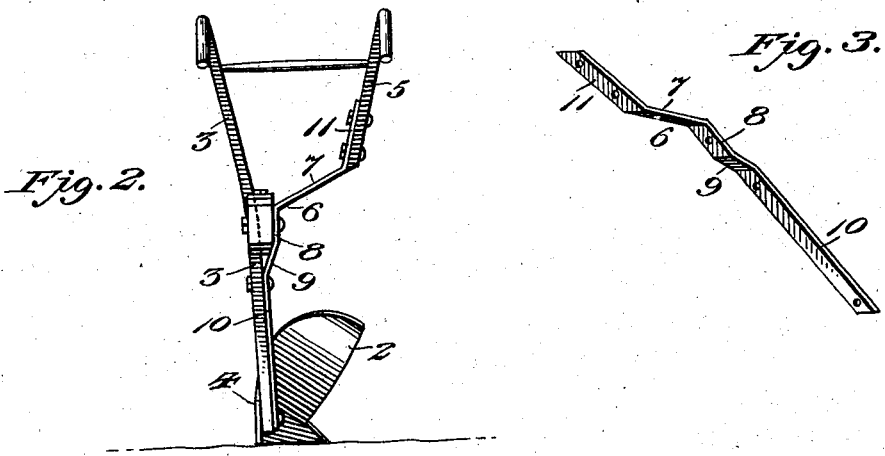
Figure 3:
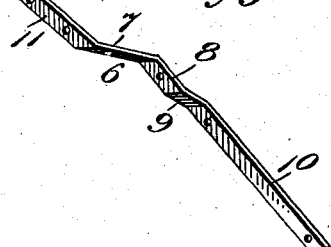

In the drawings, Figure 1 is a perspective view of a plow embodying the features of the invention. Fig. 2 is a rear end elevation of the same. Fig. 3 is a detail perspective view of a securing-bar forming part of the improvement.

Similar numerals of reference are employed to indicate corresponding parts in the several views.

The numeral 1 designates a plow-beam having a plowshare 2 attached thereto in any preferred manner and of the usual turn form and comprising a moldboard and landside. One of the handles 3 extends across the rear end of the beam 1 and is preferably let into the latter, as clearly indicated by Fig. 2, and has its lower end secured to the landside 4 of the plowshare. The other handle 5 is short and is connected by securing-bars 6 to the rear end of the beam 1 on the side opposite that over which the handle 3 passes and also the latter handle below the beam. As clearly shown by Fig. 3, the securing-bar is bent to provide a downwardly-inclined cross member 7 and continuing into a vertical bend 8 to bear against the side of the beam, and from said bend 8 an inwardly-inclined bend 9 continues to bring the lower extremity 10 of the bar under the beam 1 and flat against the adjacent side of the handle 3. The upper extremity 11 of the securing-bar is attached by bolts to the inner side of the lower extremity of the handle 5, and the vertical bend 8 is bolted to the beam 1. The lower extremity 10 is bolted to the part of the handle 3 below the beam at a point adjacent to the under edge of the beam and to the under end of said handle 3. The bolt connecting the lower end of the bar 10 with the lower end of the handle 3 also passes through the landside 4 of the plow, as clearly shown by Fig. 2, and it will be seen that loosening of the handles is rendered impossible, and, furthermore, the handle 3 between the beam and landside is materially strengthened by the use of the bar 6. Furthermore, the plowshare is reinforced by extending the handle 3 downwardly thereto and securing it to the landside. The landside is also materially braced, and the plow structure generally is strengthened and rendered more durable. It will be observed that there is no construction in the present improved form of plow which will serve as a means for holding and carrying soil in connection with the plow, and thus the general plow structure will be lightened, and additional weight will not be imparted thereto by accumulations of soil thereon. Moreover, the plow will not become choked when used in ground of a trashy nature or having a heavy growth thereon.

Having thus fully described the invention, what is claimed as new is—

1. In a plow, the combination with a beam and share, comprising a landside, of an elongated handle secured to one side of the rear end of the beam and to the landside below the beam, and a shorter handle having a securing-bar attached thereto and to the beam and elongated handle.

2. In a plow, the combination with a beam and plowshare, comprising a landside, of an elongated handle secured to the rear end of the beam and the landside, and a shorter handle connected to the beam and the elongated handle.

3. In a plow, the combination with a beam and plowshare, comprising a landside, of an elongated handle secured to the beam and the landside, a shorter handle, and a securing-bar attached to the lower extremity of the shorter handle and to the beam and elongated handle below the latter, the lower extremity of the said bar extending over the elongated handle below the beam and secured to said elongated handle.

In testimony whereof I affix my signature in presence of two witnesses.

WILLIAM T. ELLIS.

Witnesses:
A. RIED,
P. H. BUFORD.